(12) United States Patent
Magalhaes et al.

(10) Patent No.: US 11,181,209 B2
(45) Date of Patent: Nov. 23, 2021

(54) FLUID SWIVEL

(71) Applicant: Bell Helicopter Textron Inc., Fort Worth, TX (US)

(72) Inventors: Brandon Anthony Magalhaes, Richland Hills, TX (US); Todd Kenneth Wise, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 594 days.

(21) Appl. No.: 16/004,376

(22) Filed: Jun. 9, 2018

(65) Prior Publication Data
US 2019/0376620 A1  Dec. 12, 2019

(51) Int. Cl.
| | |
|---|---|
| F16L 27/08 | (2006.01) |
| F16L 3/015 | (2006.01) |
| F01M 11/06 | (2006.01) |
| B60R 16/08 | (2006.01) |
| B64C 27/52 | (2006.01) |

(52) U.S. Cl.
CPC ............ *F16L 3/015* (2013.01); *F01M 11/064* (2013.01); *F16L 27/0849* (2013.01); *B60R 16/08* (2013.01); *B64C 27/52* (2013.01)

(58) Field of Classification Search
CPC . F16L 27/0849; F16L 27/0845; F16L 27/087; F16L 27/093; F16L 39/04
USPC .......................................... 285/121.3, 121.5
See application file for complete search history.

(56) References Cited

U.S. PATENT DOCUMENTS

| | | | |
|---|---|---|---|
| 2,372,721 A | 4/1945 | Harcourt | |
| 2,659,615 A | 11/1953 | McClain | |
| 2,693,373 A | 11/1954 | Tremolada | |
| 2,849,244 A | 8/1958 | Sampson | |
| 2,943,868 A | 7/1960 | Hanback | |
| 4,142,742 A * | 3/1979 | Cornett | F16L 39/04 285/121.3 |
| 4,422,676 A * | 12/1983 | Sitabkhan | F16L 39/04 285/121.4 |
| 4,475,751 A * | 10/1984 | Nishimura | F16L 37/56 280/421 |
| 4,570,978 A | 2/1986 | Arendt | |

(Continued)

FOREIGN PATENT DOCUMENTS

WO     2009010807 A2     1/2009

OTHER PUBLICATIONS

European Search Report in related European Patent Application No. 18187176.5, dated Jan. 3, 2019, 4 pages.

(Continued)

*Primary Examiner* — David Bochna (74) *Attorney, Agent, or Firm* — Lightfoot & Alford PLLC (57) ABSTRACT

A fluid swivel includes at least two separate fluid paths extending therethrough, configured to convey fluid across a hinge. The fluid swivel includes a first end configured to be coupled to a first pair of lines on a first side of the hinge, a second end configured to be coupled to a second pair of lines on a second side of the hinge, a joint between the first end and the second end, a first pair of tubes extending from the first end to the joint, and a second pair of tubes extending from the joint to the second end, wherein the first and second tubes lie in a plane that is generally perpendicular to an axis of rotation of the joint.

7 Claims, 10 Drawing Sheets

(56) References Cited

U.S. PATENT DOCUMENTS

| | | | | |
|---|---|---|---|---|
| 4,928,997 | A | * | 5/1990 | Reisener ................ F16L 39/04 |
| | | | | 285/121.6 |
| 5,110,159 | A | * | 5/1992 | Herold .................... F16L 39/04 |
| | | | | 285/121.3 |
| 5,405,173 | A | * | 4/1995 | Goughneour ....... F16L 27/0849 |
| | | | | 285/147.1 |
| 5,651,567 | A | * | 7/1997 | Kaleniecki ............. F16L 39/04 |
| | | | | 285/121.3 |
| 5,713,609 | A | * | 2/1998 | Mascola ............... F16L 27/093 |
| | | | | 285/121.3 |
| 2009/0293970 | A1 | * | 12/2009 | Fuller .................. F16L 27/087 |
| | | | | 137/625 |
| 2017/0305565 | A1 | | 10/2017 | Kooiman et al. |

OTHER PUBLICATIONS

European Exam Report in related European Patent Application No. 18187176.5, dated Jan. 28, 2019, 6 pages.
European Exam Report in related European Patent Application No. 18187176.5, dated Jul. 12, 2019, 5 pages.

* cited by examiner

FLUID SWIVEL

BACKGROUND

Tiltrotor aircraft include at least one pair of proprotors that rotate between a vertically-oriented helicopter position and a horizontally-oriented airplane position. There are several fluids, such as oil, coolant, and hydraulic fluid, that must be transferred between a fixed portion of the aircraft and the rotatable proprotors. Because the proprotors rotate ninety degrees or more, relying on hoses to accommodate the flexion is not always feasible. As such, there is a need to utilize a fluid swivel that can accommodate the rotation of the fluid paths.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a low-profile fluid swivel for transmitting fluid across a hinge axis. While the fluid swivel is shown, and discussed for use, with rotatable proprotors of a tiltrotor aircraft, it should be understood that the fluid swivel could be used anywhere it is required to transmit fluids across a hinge. The fluid swivel includes at least two separate fluid paths, usually a delivery path and a return path. The fluid swivel includes a first end configured to be coupled to a first pair of lines on a first side of the hinge, a second end configured to be coupled to a second pair of lines on a second side of the hinge, a joint between the first end and the second end, a first pair of tubes extending from the first end to the joint, and a second pair of tubes extending from the joint to the second end. The fluid swivel has a low profile because the first and second tubes lie in a plane that is substantially perpendicular to an axis of rotation of the joint. For example, utilizing a design disclosed herein would enable manufacture of a fluid swivel with five-eighths of an inch internal diameter fluid tubes to have a total width of approximately three inches, or 1 inch internal diameter fluid tubes to have a total width of approximately four and a half inches.

Figure 1:
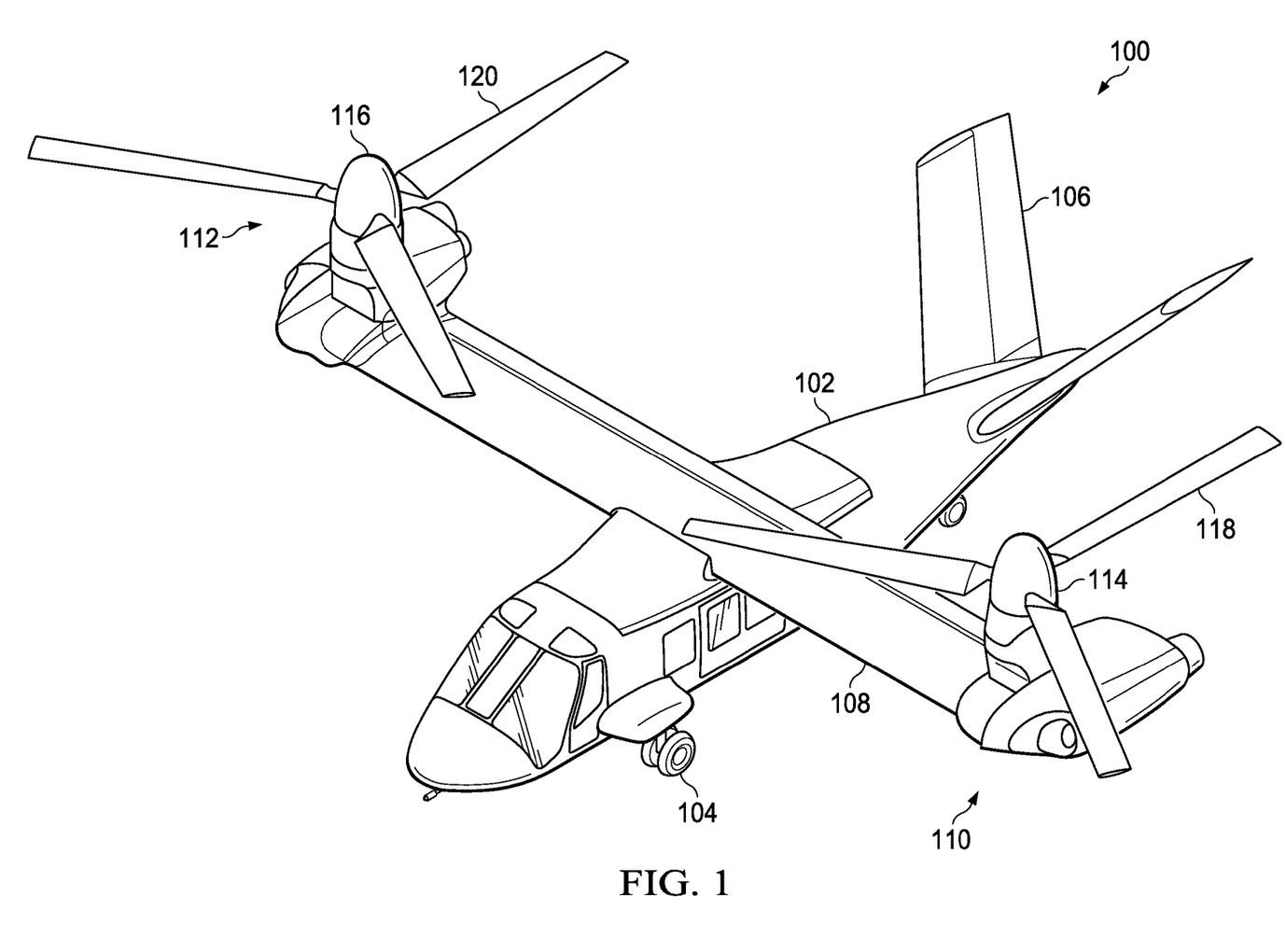
FIG. 1 is an oblique view of a tiltrotor aircraft according to this disclosure showing the aircraft in a helicopter mode of operation.
Figure 2:
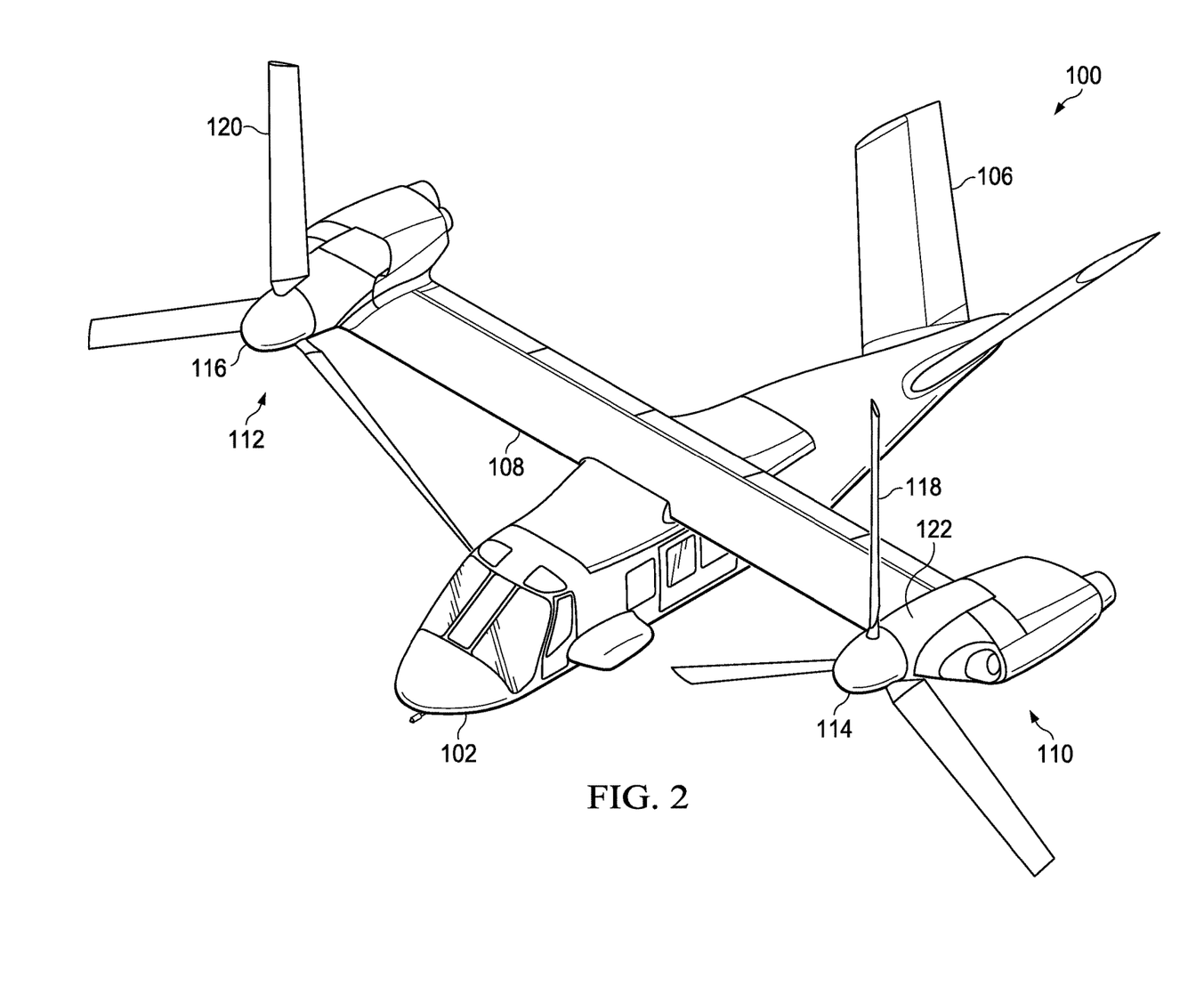
FIG. 2 is an oblique view of the aircraft of FIG. 1 showing the aircraft in an airplane mode of operation.

Referring to FIGS. 1 and 2, a tiltrotor aircraft 100 is illustrated. Tiltrotor aircraft 100 includes a fuselage 102, a landing gear 104, a tail member 106, a wing 108, a propulsion system 110, and a propulsion system 112. Each propulsion system 110 and 112 includes an engine and a rotatable proprotor 114 and 116, respectively. Each rotatable proprotor 114 and 116 has a plurality of rotor blades 118 and 120, respectively, associated therewith. The position of proprotors 114 and 116, as well as the pitch of rotor blades 118 and 120, can be selectively controlled to control direction, thrust, and lift of tiltrotor aircraft 100.

FIG. 1 illustrates tiltrotor aircraft 100 in a helicopter mode, in which proprotors 114 and 116 are positioned substantially vertical to provide a lifting thrust. FIG. 2 illustrates tiltrotor aircraft 100 in an airplane mode, in which proprotors 114 and 116 are positioned substantially horizontal to provide a forward thrust in which a lifting force is supplied by wing 108. It should be appreciated that tiltrotor aircraft 100 can be operated such that proprotors 114 and 116 are selectively positioned between airplane mode and helicopter mode, which can be referred to as a conversion mode.

Figure 3:
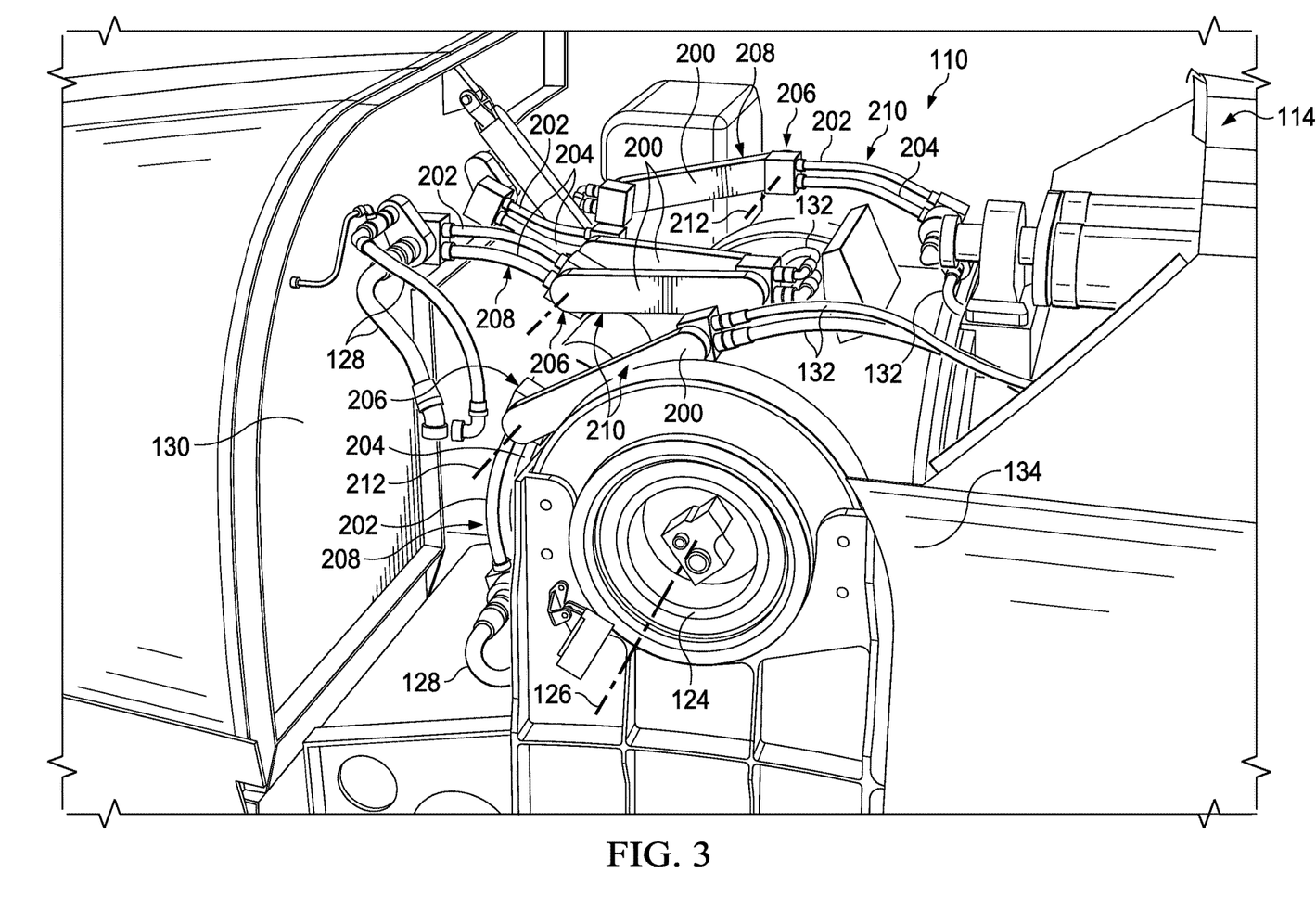
FIG. 3 is an oblique view of an interior of a proprotor showing a plurality of fluid swivels according to this disclosure.
Figure 4:
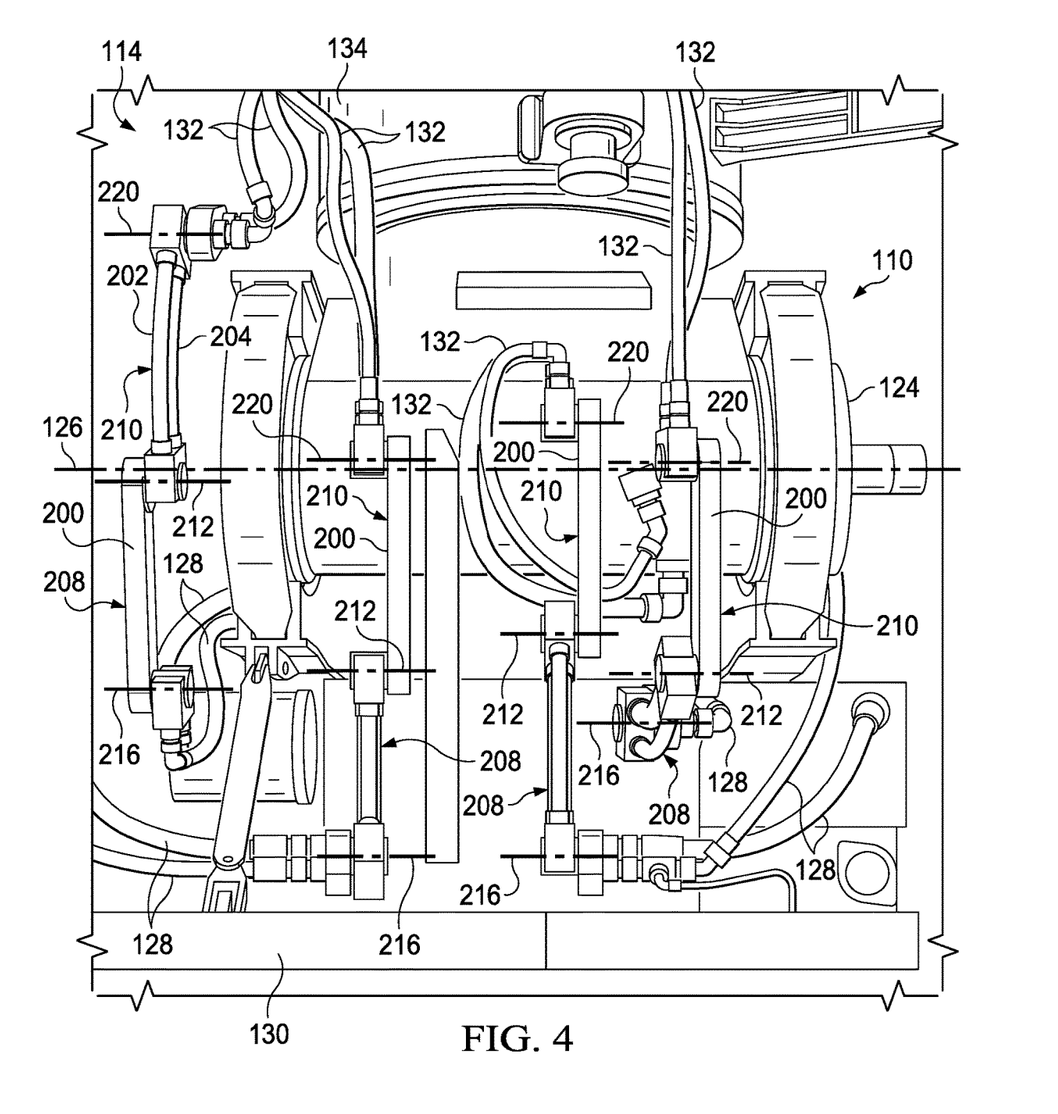
FIG. 4 is an oblique top view of the interior of the proprotor shown in FIG. 3.

FIGS. 3 and 4 illustrate a portion of propulsion system 110 with a cowling 122 removed to show a hinge 124 with a hinge axis 126 about which proprotor 114 rotates, shown with proprotor 114 in airplane mode. Also shown are a plurality of fluid swivels 200 coupled between first pairs of fluid lines 128 on a first side 130 of hinge 124 and second pairs of fluid lines 132 on a second side 134 of hinge 124. In the embodiment shown, first side 130 is fixed relative to wing 108 and second side 134 rotates about hinge axis 126 relative to first side 130. In addition, first pairs of fluid lines 128 are fixed relative to first side 130 and second pairs of fluid lines 132 are fixed relative to second side 134.

Still referring to FIGS. 3 and 4, plurality of fluid swivels 200 are provided to circulate fluids, such as oil, coolant, or hydraulic fluid, across hinge 124 from first side 130 to second side 134 and back. Each fluid swivel 200 includes a first fluid path 202 and a second fluid path 204 that extend across hinge 124 to connect first pair of fluid lines 128 with second pair of fluid lines 132, allowing the fluid to pass through fluid swivel 200. Each fluid swivel 200 includes a center joint 206 along first and second fluid paths 202 and 204 that divides first and second fluid paths 202 and 204 into a first portion 208 and a second portion 210, such that first portion 208 and second portion 210 rotate relative to each other about a center-joint axis 212. In addition, each fluid swivel 200 includes a first-end joint 214 that enables a section of first portion 208 to rotate relative to first pair of fluid lines 128 about a first-end-joint axis 216 and a second-end joint 218 that enables a section of second portion 210 to rotate relative to second pair of fluid lines 132 about a second-end-joint axis 220. Center-joint axes 212, as well as first-end-joint axes 216 and second-end-joint axes 220, should all be substantially parallel to hinge axis 126. As such, first side 130, the section of first portion 208 between center joint 206 and first-end joint 214, the section of second portion 210 between center joint 206 and second-end joint 218, and second side 134 operate as the four bars of a four-bar linkage when proprotor 114 rotates between airplane mode and helicopter mode.

As best shown in FIG. 4, fluid swivels 200 have a low lateral profile because the fluid paths are stacked vertically relative to horizontal axes 126, 212, 216, and 220. That is, with respect to each fluid swivel 200, a majority of a length of first portion 208 of first fluid path 202 and second fluid path 204 lie in a first plane that is substantially perpendicular to center-joint axis 212 and a majority of a length of second portion 210 of the first fluid path 202 and the second fluid path 204 lie in a second plane that is substantially perpendicular to center-joint axis 212. The relative orientations of axes 126, 212, 216, and 220 and the first and second planes need not be precise, as a few degrees of deflection is permitted to allow for some flexing and/or minor misalignment. This flexing and misalignment is accounted for by configuring first portion 208 to have some flexibility transverse to the first plane, thereby permitting some relative, out of the first plane, movement between center joint 206 and first pair of fluid lines 128. It should be understood that, in addition to, or instead of first portion 208, second portion 210 could be configured to have some flexibility transverse to the second plane, thereby permitting some relative, out of the second plane, movement between center joint 206 and second pair of fluid lines 132.

Figure 5:
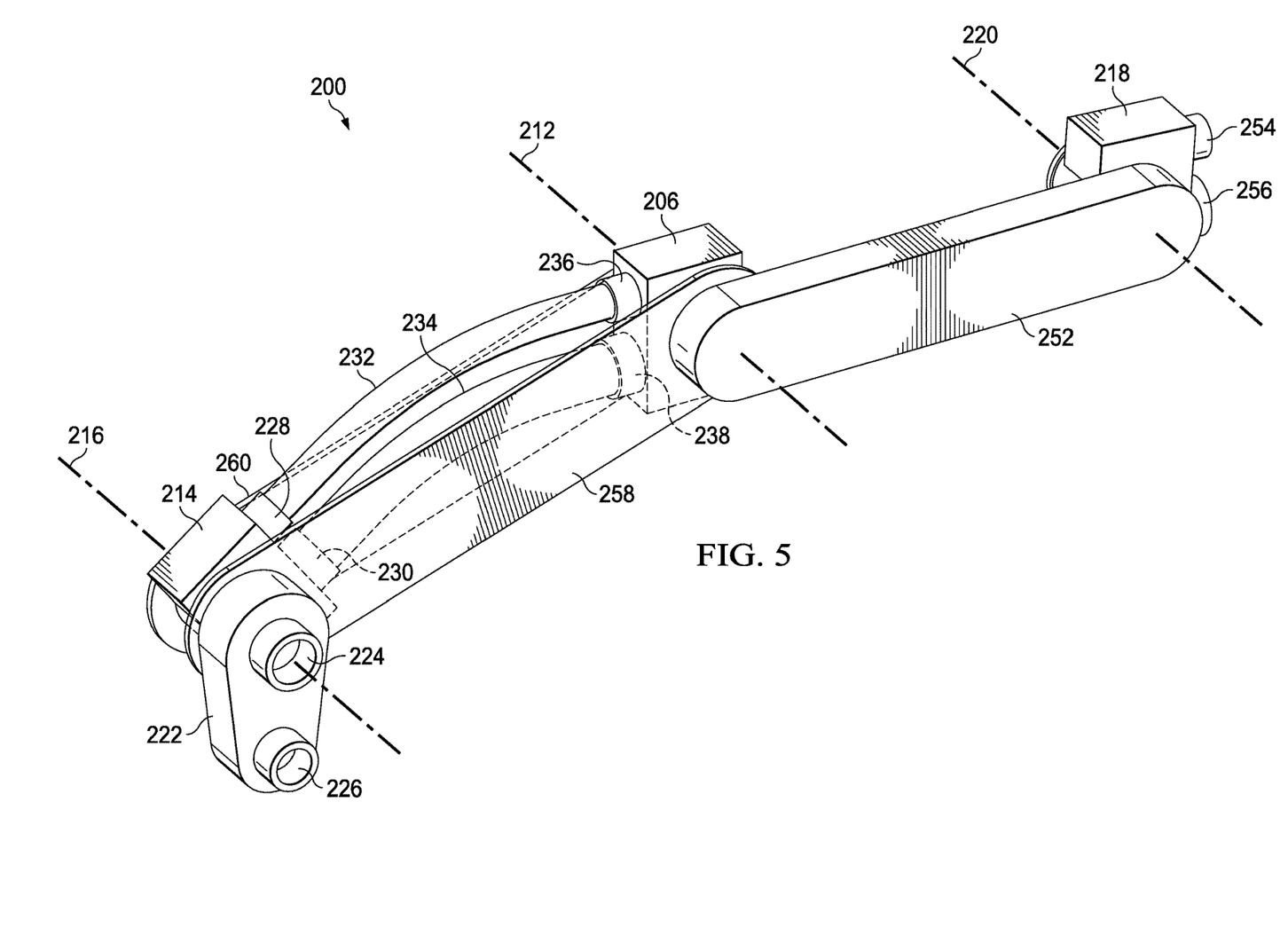
FIG. 5 is an oblique view of a fluid swivel according to this disclosure.
Figure 6:
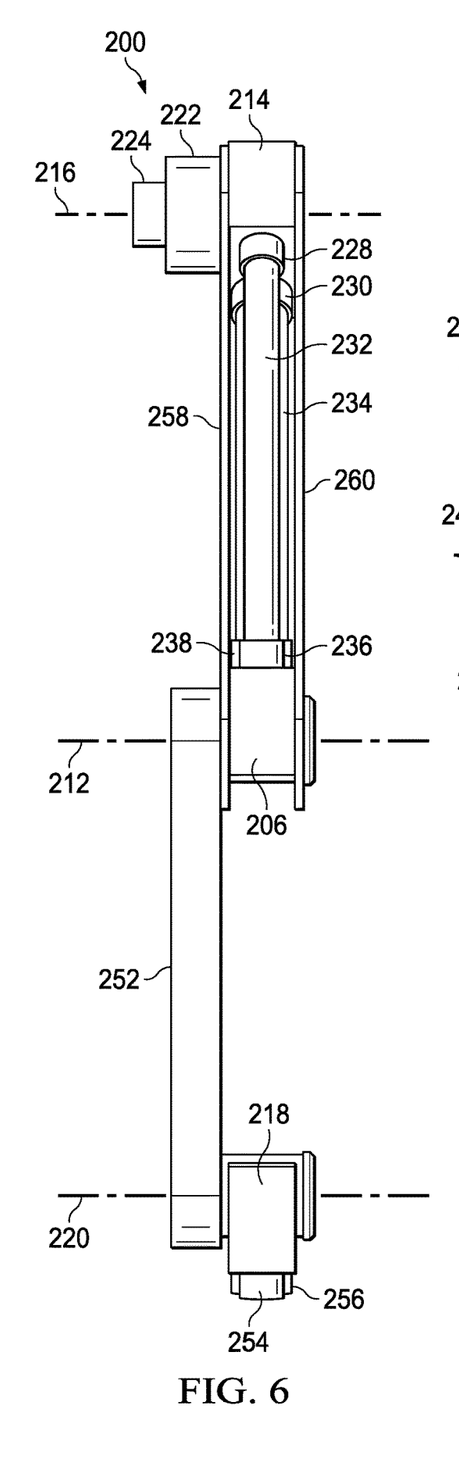
FIG. 6 is a top view of the fluid swivel of FIG. 5.
Figure 7:
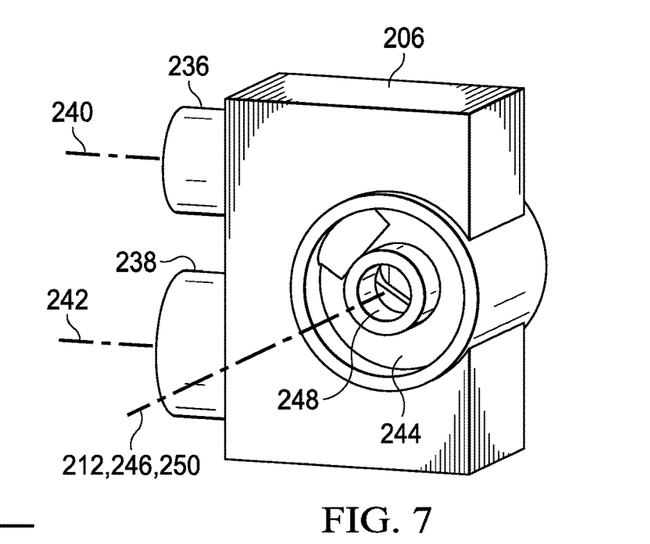
FIG. 7 is an oblique view of a joint of the fluid swivel of FIG. 5.

FIGS. 5-7 show fluid swivel 200 in more detail. Fluid swivel 200 includes a housing 222 that includes a first passageway 224 configured to be coupled to one of first pair of fluid lines 128. Housing 222 also includes a second passageway 226 configured to be coupled to the other of first pair of fluid lines 128. First passageway 224 and second passageway 226 both enter and exit housing 222 substantially parallel to first-end-joint axis 216. Housing 222 is rotatably coupled to first-end joint 214 so that housing 222 and first-end joint 214 rotate relative to each other about first-end-joint axis 216.

First-end joint 214 includes a first passage 228 in communication with first passageway 224 of housing 222 and a second passage 230 in communication with second passageway 226 of housing 222. First passage 228 and second passage 230 enter first-end joint 214 parallel to first-endjoint axis 216 and exit first-end joint 214 perpendicular to first-end-joint axis 216.

A first tube 232 is coupled to first passage 228 and a second tube 234 is coupled to second passage 230. First tube 232 is coupled to a first port 236 of center joint 206 and second tube 234 is coupled to a second port 238 of center joint 206. As shown in FIG. 7, first port 236 has a first-port axis 240 and second port 238 has a second-port axis 242, wherein both first-port axis 240 and second-port axis 242 are substantially perpendicular to center-joint axis 212. First port 236 and second port 238 are stacked such that first-port axis 240 and second-port axis 242 lie in a first plane that is substantially perpendicular to center-joint axis 212. First port 236 is in communication with a third port 244 that has a third-port axis 246 that is coaxial with center-joint axis 212. Second port 238 is in communication with a fourth port 248 that has a fourth-port axis 250 that is coaxial with centerjoint axis 212.

A rigid unitary member 252 is rotatably coupled to center joint 206. Member 252 includes a third tube and a fourth tube that extend therethrough (not shown). The third tube is in communication with third port 244 and the fourth tube is in communication with fourth port 248. While not shown, it should be understood that because the third tube is in communication with first tube 232, through first port 236 and third port 244, the third tube should have approximately the same cross-sectional area as first tube 232. Similarly, because the fourth tube is in communication with second tube 234, through second port 238 and fourth port 248, the fourth tube should have approximately the same cross-sectional area as second tube 234. It should be noted that because first tube 232 and second tube 234 may be carrying different volumes of fluids or fluids at drastically different pressures, the cross-sectional areas thereof may be different, depending on the particular application of fluid swivel 200.

It should be noted that while center-joint axis 212, third-port axis 246, and fourth-port axis 250 are shown as coaxial, they need not be. For example, fourth port 248 may be radially offset from center-joint axis 212. However, it is preferable that a perimeter of fourth port 248 surrounds center-joint axis 212. In addition, it is not necessary that third port 244 surround the entire perimeter of fourth port 248, as shown in FIG. 7. Because center joint 206 rotates relative to member 252, third port 244 need only extend as far around the perimeter of fourth port 248 as is required to accommodate the intended degree of rotation for the particular application. For example, if the application requires ninety degrees of rotation, then third port 244 should surround at least one quarter of the perimeter of fourth port 248.

Second-end joint 218 is rotatably coupled to member 252 about second-end-joint axis 220. Second-end joint 218 includes a first duct 254 in communication with the third tube of member 252 and a second duct 256 in communication with the fourth tube of member 252. First duct 254 and second duct 256 enter second-end joint 218 parallel to second-end-joint axis 220 and exit second-end joint 218 perpendicular to second-end-joint axis 220. In addition, first duct 254 is configured to be coupled to one of second pair of fluid lines 132 and second duct 256 is configured to be coupled to the other of second pair of fluid lines 132.

Accordingly, first fluid path 202 conveys fluid from one of first pair of fluid lines 128 on first side 130 of hinge 124 to one of second pair of fluid lines 132 on second side 134 of hinge 124. First fluid path 202 includes: first passageway 224 of housing 222, first passage 228 of first-end joint 214, first tube 232, first port 236 and third port 244 of center joint 206, the third tube of member 252, and first duct 254 of second-end joint 218. Second fluid path 204 conveys fluid from the other of first pair of fluid lines 128 on first side 130 of hinge 124 to the other of second pair of fluid lines 132 on second side of hinge 124. Second fluid path 204 includes: second passageway 226 of housing 222, second passage 230 of first-end joint 214, second tube 234, second port 238 and fourth port 248 of center joint 206, the fourth tube of member 252, and second duct 256 of second-end joint 218.

In order to accommodate lateral misalignment, first tube 232 and second tube 234 are made of a semi-flexible hosing to permit flexing, and a first support member 258 and a second support member 260 are coupled between first-end joint 214 and center joint 206. First support member 258 and second support member 260 are stiff perpendicular to first-end-joint axis 216 and center-joint axis 212 so that they carry the load and act as the driving link between first-end joint 214 and center joint 206 during movement of fluid swivel 200, but the thin material of support members 258 and 260 parallel to first-end-joint axis 216 and center-joint axis 212 allows for some relative movement between first-end joint 214 and center joint 206.

While first-end joint 214 and second-end joint 218 are not shown individually, as center joint 206 is in FIG. 7, it should be understood that the structure of first-end joint 214 and second-end joint 218 are substantially similar to that of center joint 206.

Figure 8A:
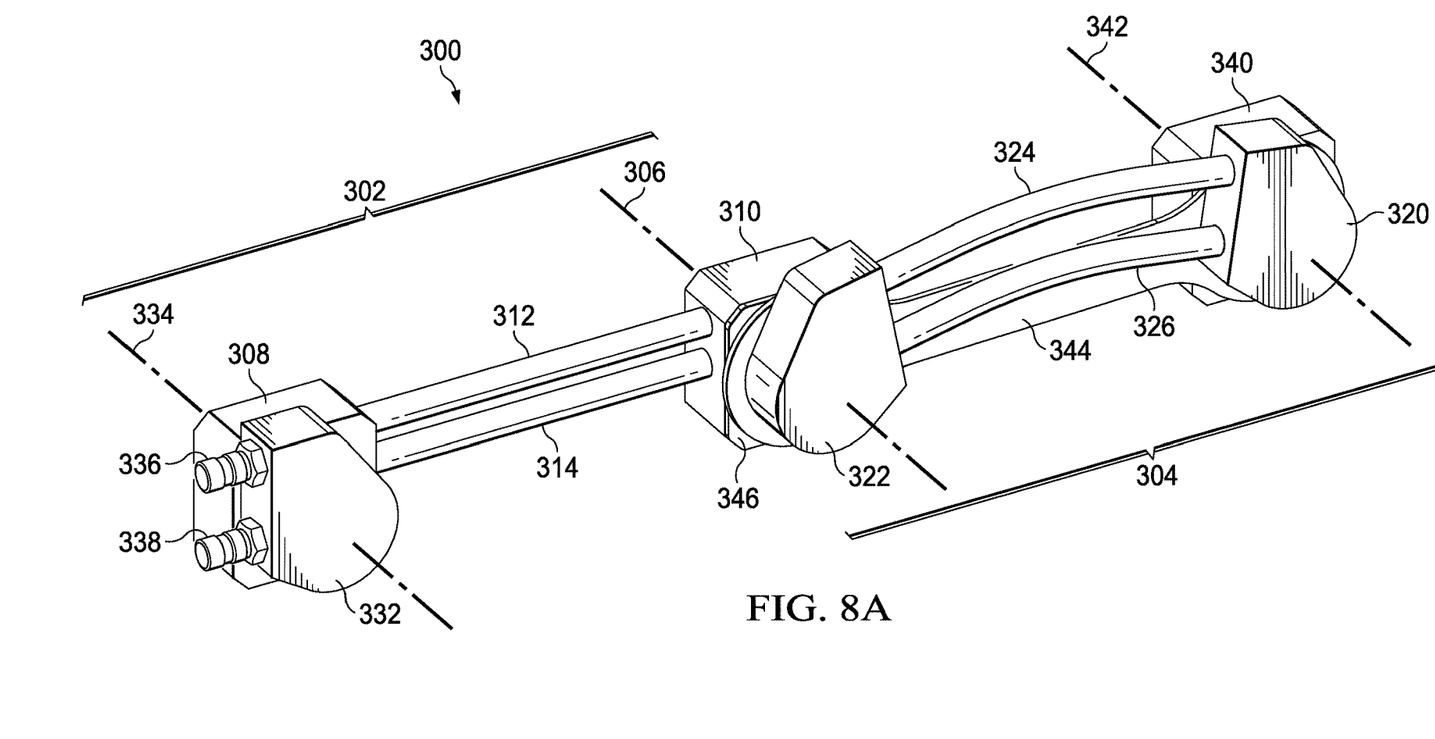
FIG. 8A is an oblique view of another fluid swivel according to this disclosure, shown in an extended position.
Figure 8B:
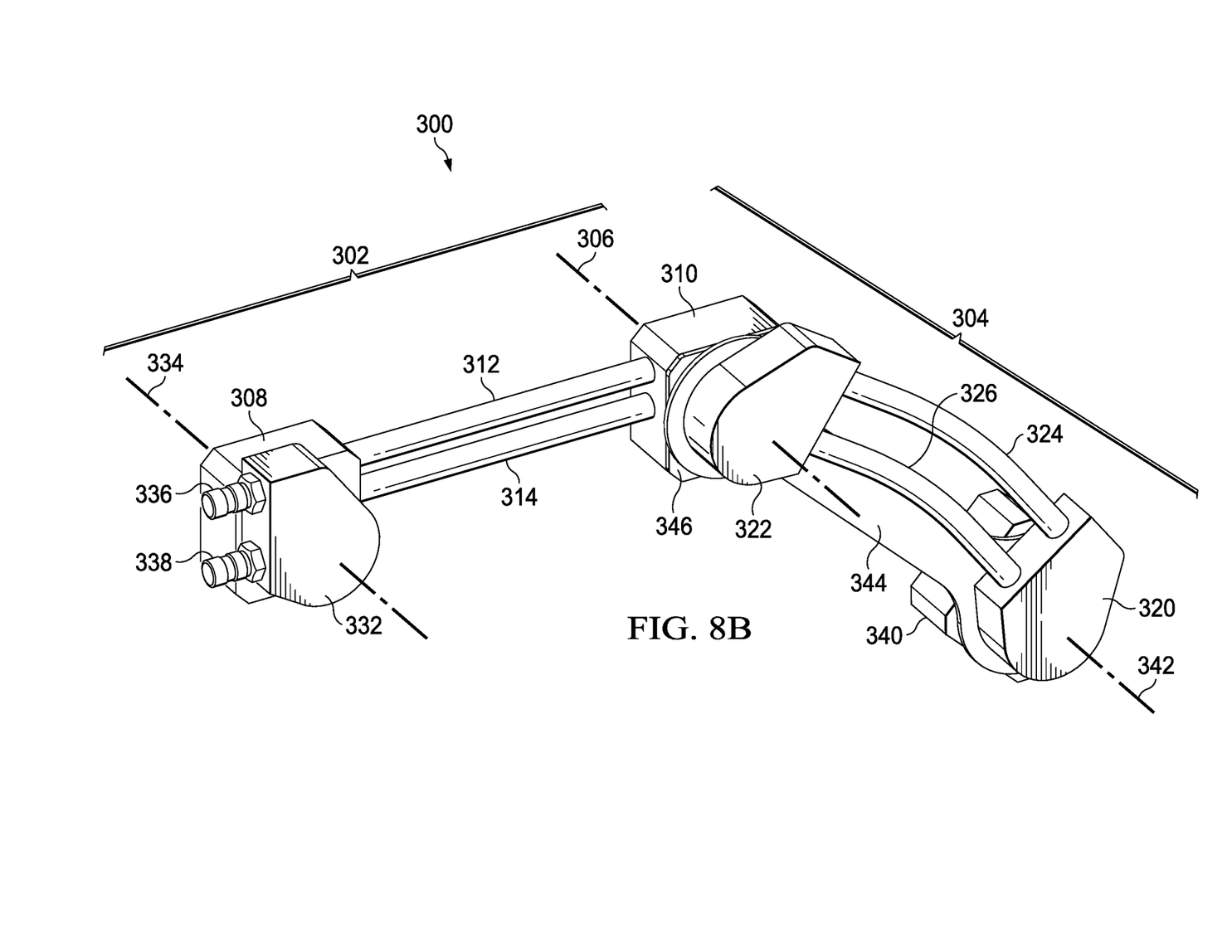
FIG. 8B is an oblique view of the fluid swivel of FIG. 8A shown in a semi-folded position.
Figure 9:
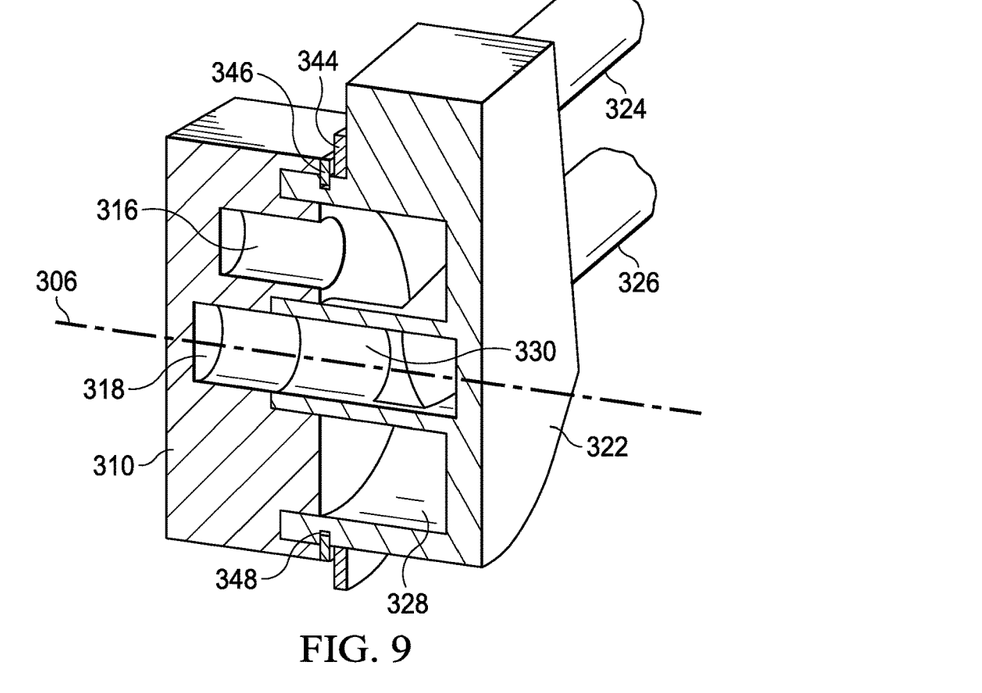
FIG. 9 is an oblique, cross-sectional view of a joint of FIG. 8A.
Figure 10:
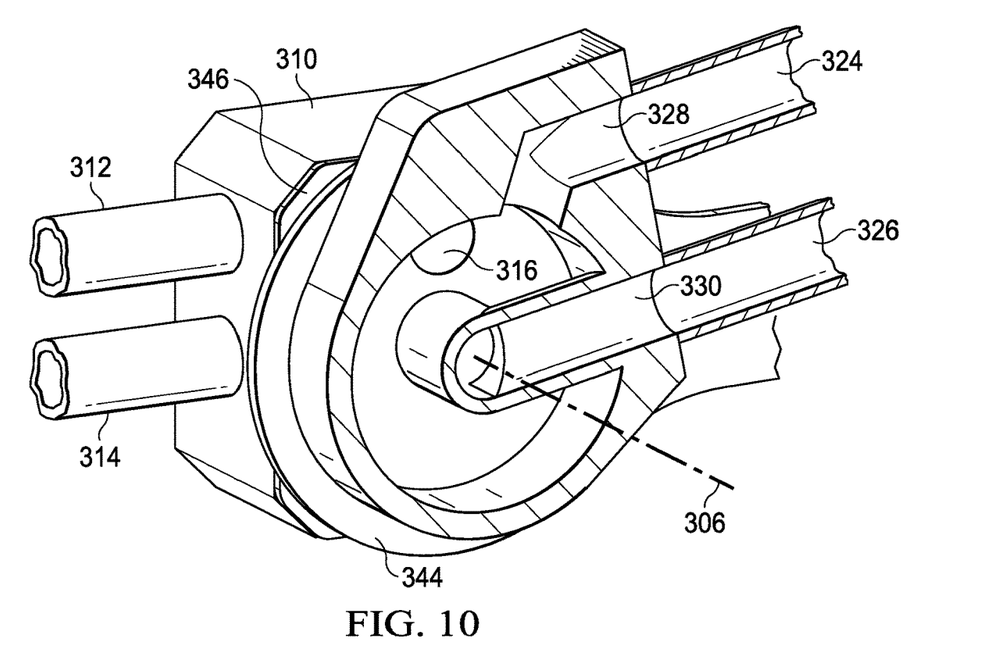
FIG. 10 is an oblique, cross-sectional view of the joint of FIG. 8A.
Figure 11:
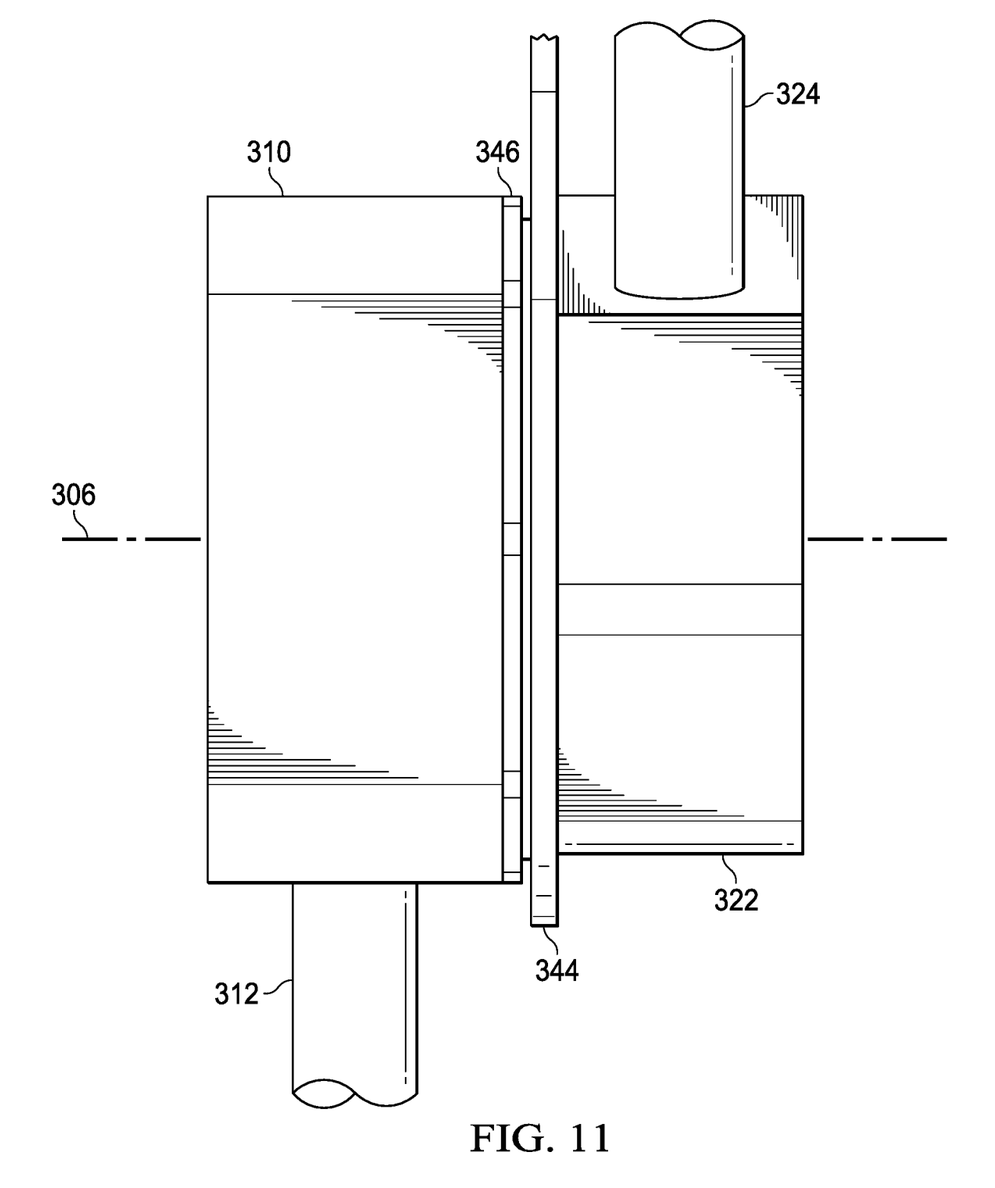
FIG. 11 is a top view of the joint of FIG. 8A.

FIGS. 8A-11 show a fluid swivel 300. Fluid swivel 300 includes a first link 302 rotatably coupled to a second link 304 about a center-joint axis 306. First link 302 includes a first-end member 308, a center member 310, and a first tube 312 and a second tube 314 coupled between first-end member 308 and center member 310. First tube 312 and second tube 314 are substantially parallel to each other along a majority of their lengths. As shown, the length of first tube 312 and center-joint axis 306 are skew. That is, first tube 312 is offset from center-joint axis 306. Conversely, as shown, the length of second tube 314 would intersect center-joint axis 306. However, it should be understood that second tube 314 may be offset from center-joint axis 306 as well. First-end member 308 includes a first passage and a second passage extending therethrough (not shown), wherein the first passage and the second passage each have an entrance and an exit that are substantially perpendicular to each other. As shown in FIGS. 9 and 10, center member 310 includes a first duct 316 and a second duct 318 extending therethrough, wherein first duct 316 and second duct 318 each have an entrance and an exit that are substantially perpendicular to each other. Accordingly, the first passage of first-end member 308, first tube 312, and first duct 316 are all in communication with each other, and the second passage of first-end member 308, second tube 314, and second duct 318 are all in communication with each other.

Second link 304 includes a second-end member 320, a central member 322, and a third tube 324 and a fourth tube 326 coupled between second-end member 320 and central member 322. Third tube 324 and fourth tube 326 are substantially parallel to each other along a majority of their lengths. As shown, the length of third tube 324 and center-joint axis 306 are skew. That is, third tube 324 is offset from center-joint axis 306. Conversely, as shown, the length of fourth tube 326 would intersect center-joint axis 306. However, it should be understood that fourth tube 326 may be offset from center-joint axis 306 as well. Second-end member 320 includes a first passageway and a second passageway extending therethrough (not shown), wherein the first passageway and the second passageway each have an entrance and an exit that are substantially perpendicular to each other. As shown in FIGS. 9 and 10, central member 322 includes a first tunnel 328 and a second tunnel 330 extending therethrough, wherein first tunnel 328 and second tunnel 330 each have an entrance and an exit that are substantially perpendicular to each other. Accordingly, the first passageway of second-end member 320, third tube 324, and first tunnel 328 are all in communication with each other, and the second passageway of second-end member 320, fourth tube 326, and second tunnel 330 are all in communication with each other.

Fluid swivel 300 further includes a first-end housing 332 rotatably coupled to first-end member 308 about a first-end axis 334. First-end housing 332 includes a first conduit 336 and a second conduit 338 extending therethrough, wherein first conduit 336 and second conduit 338 each have an entrance and an exit that are substantially perpendicular to each other. First conduit 336 is coupled to the first passage of first-end member 308 and is configured to be coupled to one of first pair of fluid lines 128. Second conduit 338 is coupled to the second passage of first-end member 308 and is configured to be coupled to the other of first pair of fluid lines 128.

Fluid swivel 300 further includes a second-end housing 340 rotatably coupled to second-end member 320 about a second-end axis 342. Second-end housing 340 includes a first route and a second route extending therethrough (not shown), wherein the first route and the second route each have an entrance and an exit that are substantially perpendicular to each other. Alternatively, the entrance and exit of the first and second routes may both be oriented parallel to second-end axis 342. The first route is coupled to the first passageway of second-end member 320 and is configured to be coupled to one of second pair of fluid lines 132. The second route is coupled to the second passageway of second-end member 320 and is configured to be coupled to the other of second pair of fluid lines 132.

First tube 312 and second tube 314 are formed of a rigid material. As such, in order to accommodate lateral misalignment, third tube 324 and fourth tube 326 are made of a semi-flexible hosing to permit flexing, and a support member 344 is coupled between central member 322 and second-end member 320. Support member 344 is stiff perpendicular to second-end axis 342 and center-joint axis 306, but the thin material of support member 344 parallel to second-end axis 342 and center-joint axis 306 allows for some relative movement between second-end member 320 and central member 322.

As shown in FIG. 9, center member 310 is coupled to central member 322 by a clip 346. Clip 346 is coupled to center member 310 and extends into a groove 348 in central member 322 in order to retain central member 322 in contact with center member 310. While not shown, it should be understood that first-end member 308 is coupled to first-end housing 332 in a similar manner, and that second-end member 320 is also coupled to second-end housing 340 in a similar manner.

While the first and second passages of first-end member 308, the first and second passageways of second-end member 320, and the first and second routes of second-end housing 340 are not shown, it should be understood that their structures are substantially similar to that of first duct 316 and second duct 318 of center member 310, and first tunnel 328 and second tunnel 330 of central member 322.

While tiltrotor aircraft 100 is shown for use with fluid swivels 200, it should be understood that fluid swivels 300 may be utilized. In addition, it should be understood that the fluid swivels described herein are not limited to use on aircraft. The fluid swivels described herein may be utilized in any application where fluids need to be conveyed across a hinge axis.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A fluid swivel, comprising:
a center joint configured to allow rotation about a center-joint axis, comprising:
a first port having a first-port axis that is substantially perpendicular to the center-joint axis;
a second port having a second-port axis that is substantially perpendicular to the center-joint axis;
a third port in communication with the first port, the third port having a third-port axis that is substantially parallel to the center-joint axis; and
a fourth port in communication with the second port, the fourth port having a fourth-port axis that is substantially parallel to the center-joint axis;
wherein the first-port axis and the second-port axis lie in a first plane that is substantially perpendicular to the center-joint axis; and
wherein the center-joint axis passes through the fourth port; wherein the third port surrounds at least one quarter of a perimeter of the fourth port;
a first-end joint configured to allow rotation about a first-end-joint axis, the first-end joint comprising:
a first passage having an entrance and an exit that are substantially perpendicular to each other; and
a second passage having an entrance and an exit that are substantially perpendicular to each other;
a first tube coupled between the first passage of the first-end joint and the first port of the center joint; and
a second tube coupled between the second passage of the first-end joint and the second port of the center joint;
a second-end joint configured to allow rotation about a second-end-joint axis, the second-end joint comprising:
a first duct having an entrance and an exit that are substantially perpendicular to each other; and
a second duct having an entrance and an exit that are substantially perpendicular to each other;
a third tube coupled between the first duct of the second-end joint and the third port of the center joint; and
a fourth tube coupled between the second duct of the second-end joint and the fourth port of the center joint;
wherein the first duct of the second-end joint is configured to be coupled to a first line and the second duct of the second-end joint is configured to be coupled to a second line;
a housing rotatably coupled to the first-end joint, the housing comprising:
a first passageway in communication with the first passage of the first-end joint and configured to be coupled to a third line; and
a second passageway in communication with the second passage of the first-end joint and configured to be coupled to a fourth line and;
a support member coupled between the first-end joint and the center joint, the support member permitting relative movement between the first-end joint and the center joint transverse to the first plane and preventing relative translation between the first-end joint and the center joint parallel to the first plane;
wherein the third tube and the fourth tube are defined by a rigid unitary member configured to rotate relative to the center joint about the center-joint axis and relative to the second-end joint about the second-end-joint axis.

2. A fluid swivel, comprising:
a first link including a first tube and a second tube, the first tube and the second tube being substantially parallel to each other along a majority of their lengths; and
a second link rotatably coupled to the first link about a center-joint axis, the second link including a third tube and a fourth tube;
wherein the fourth tube is in fluid communication with a fluid passage through which the center-joint axis passes; and
wherein the first link includes a first-end member configured to allow rotation about a first-end axis and a center member configured to allow rotation about the center-joint axis, the first-end member comprising:
a first passage having an entrance and an exit that are substantially perpendicular to each other, the first passage being coupled to the first tube; and
a second passage having an entrance and an exit that are substantially perpendicular to each other, the second passage being coupled to the second tube;
the center member comprising:
a first duct having an entrance and an exit that are substantially perpendicular to each other, the first duct being coupled to the first tube; and
a second duct having an entrance and an exit that are substantially perpendicular to each other, the second duct being coupled to the second tube.

3. The fluid swivel of claim 2, wherein the second link includes a second-end member configured to allow rotation about a second-end axis and a central member configured to allow rotation about the center-joint axis, the second-end member comprising:
a first passageway having an entrance and an exit that are substantially perpendicular to each other, the first passageway being coupled to the third tube; and
a second passageway having an entrance and an exit that are substantially perpendicular to each other, the second passageway being coupled to the fourth tube;

the central member of the second link comprising:
   a first tunnel having an entrance and an exit that are substantially perpendicular to each other, the first tunnel being coupled to the first duct and the third tube; and
   a second tunnel having an entrance and an exit that are substantially perpendicular to each other, the second tunnel being coupled to the second duct and the fourth tube.

4. The fluid swivel of claim 3, further comprising:
a first-end housing rotatably coupled to the first-end member, the first-end housing comprising:
   a first conduit having an entrance and an exit that are substantially perpendicular to each other, the first conduit being in communication with the first passage and configured to be coupled to a first line; and
   a second conduit having an entrance and an exit that are substantially perpendicular to each other, the second conduit being in communication with the second passage and being configured to be coupled to a second line.

5. The fluid swivel of claim 4, further comprising:
a clip coupled to the center member, the clip extending into a groove in the central member.

6. The fluid swivel of claim 5, wherein at least a portion of the first tunnel surrounds at least a portion of the second tunnel.

7. An aircraft, comprising:
a rotatable component being rotatable about a hinge axis; and
at least one of:
   (1) a fluid swivel configured to convey fluid along the hinge axis, the fluid swivel comprising:
a first link including a first tube and a second tube, the first tube and the second tube being substantially parallel to each other along a majority of their lengths; and
   a second link rotatably coupled to the first link about a center-joint axis, the second link including a third tube and a fourth tube;
   wherein the fourth tube is in fluid communication with a fluid passage through which the center-joint axis passes; and
wherein the first link includes a first-end member configured to allow rotation about a first-end axis and a center member configured to allow rotation about the center-joint axis, the first-end member comprising:
   a first passage having an entrance and an exit that are substantially perpendicular to each other, the first passage being coupled to the first tube; and
   a second passage having an entrance and an exit that are substantially perpendicular to each other, the second passage being coupled to the second tube;
   the center member comprising:
      a first duct having an entrance and an exit that are substantially perpendicular to each other, the first duct being coupled to the first tube; and
   a second duct having an entrance and an exit that are substantially perpendicular to each other, the second duct being coupled to the second tube; and
   (2) a fluid swivel configured to convey fluid along the hinge axis, the fluid swivel comprising a center joint configured to allow rotation about a center-joint axis, comprising:
      a first port having a first-port axis that is substantially perpendicular to the center-joint axis;
      a second port having a second-port axis that is substantially perpendicular to the center-joint axis;
      a third port in communication with the first port, the third port having a third-port axis that is substantially parallel to the center-joint axis; and
      a fourth port in communication with the second port, the fourth port having a fourth-port axis that is substantially parallel to the center-joint axis;
   wherein the first-port axis and the second-port axis lie in a first plane that is substantially perpendicular to the center-joint axis; and
   wherein the center-joint axis passes through the fourth port;
   wherein the third port surrounds at least one quarter of a perimeter of the fourth port;
   a first-end joint configured to allow rotation about a first-end-joint axis, the first-end joint comprising:
      a first passage having an entrance and an exit that are substantially perpendicular to each other; and
      a second passage having an entrance and an exit that are substantially perpendicular to each other;
      a first tube coupled between the first passage of the first-end joint and the first port of the center joint; and
      a second tube coupled between the second passage of the first-end joint and the second port of the center joint;
   a second-end joint configured to allow rotation about a second-end-joint axis, the second-end joint comprising:
      a first duct having an entrance and an exit that are substantially perpendicular to each other; and
      a second duct having an entrance and an exit that are substantially perpendicular to each other;
      a third tube coupled between the first duct of the second-end joint and the third port of the center joint; and
      a fourth tube coupled between the second duct of the second-end joint and the fourth port of the center joint;
      wherein the first duct of the second-end joint is configured to be coupled to a first line and the second duct of the second-end joint is configured to be coupled to a second line;
   a housing rotatably coupled to the first-end joint, the housing comprising:
      a first passageway in communication with the first passage of the first-end joint and configured to be coupled to a third line; and
      a second passageway in communication with the second passage of the first-end joint and configured to be coupled to a fourth line and;
   a support member coupled between the first-end joint and the center joint, the support member permitting relative movement between the first-end joint and the center joint transverse to the first plane and preventing relative translation between the first-end joint and the center joint parallel to the first plane;
   wherein the third tube and the fourth tube are defined by a rigid unitary member configured to rotate relative to the center joint about the center-joint axis and relative to the second-end joint about the second-end-joint axis.

* * * * *